(12) United States Patent
Nickolls et al.

(10) Patent No.: US 7,937,567 B1
(45) Date of Patent: May 3, 2011

(54) METHODS FOR SCALABLY EXPLOITING PARALLELISM IN A PARALLEL PROCESSING SYSTEM

(75) Inventors: John R. Nickolls, Los Altos, CA (US); Stephen D. Lew, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 1218 days.

(21) Appl. No.: 11/555,623

(22) Filed: Nov. 1, 2006

(51) Int. Cl.
*G06F 9/30* (2006.01)
(52) U.S. Cl. .......................................... 712/220; 712/22
(58) Field of Classification Search .............. 712/22, 712/220
See application file for complete search history.

(56) References Cited

U.S. PATENT DOCUMENTS

| | | | |
|---|---|---|---|
| 6,779,049 B2 | 8/2004 | Altman et al. | |
| 6,839,828 B2 | 1/2005 | Gschwind | |
| 6,897,871 B1 | 5/2005 | Morein et al. | |

OTHER PUBLICATIONS

Cell Microprocessor www.wikipedia.org, downloaded at.
Cell Architecture Explained Version 2, Introduction and Index, downloaded at http://www.blachford.info/computer/Cell/Cell0_v2.html on Feb. 7, 2007.
Eggers et al. "Simultaneous multithreading: A platform for next-generation processors" IEEE Micro, Sep./Oct. 1997(vol. 17, No. 5) pp. 12-19.
Gschwind et al. "Synergistic Processing in Cell's Multicore Architecture", IEEE Computer Society, vol. 26, Issue 2 (Mar. 2006) pp. 10-24.
Marr et al. "Hyper-Threading Technology Architecture and Microarchitecture",. Intel Technology Journal, vol. 06 Issue 01 Published Feb. 14, 2002.

*Primary Examiner* — Alford W Kindred
*Assistant Examiner* — Benjamin P Geib
(74) *Attorney, Agent, or Firm* — Kilpatrick Townsend & Stockton LLP

(57) ABSTRACT

Parallelism in a parallel processing subsystem is exploited in a scalable manner. A problem to be solved can be hierarchically decomposed into at least two levels of sub-problems. Individual threads of program execution are defined to solve the lowest-level sub-problems. The threads are grouped into one or more thread arrays, each of which solves a higher-level sub-problem. The thread arrays are executable by processing cores, each of which can execute at least one thread array at a time. Thread arrays can be grouped into grids of independent thread arrays, which solve still higher-level sub-problems or an entire problem. Thread arrays within a grid, or entire grids, can be distributed across all of the available processing cores as available in a particular system implementation.

18 Claims, 7 Drawing Sheets

METHODS FOR SCALABLY EXPLOITING PARALLELISM IN A PARALLEL PROCESSING SYSTEM

CROSS-REFERENCES TO RELATED APPLICATIONS

The present disclosure is related to the following commonly-assigned co-pending U.S. patent application Ser. No. 11/305,178, filed Dec. 15, 2005, entitled "Parallel Data Processing Systems and Methods using Cooperative Thread Arrays"; application Ser. No. 11/321,002, filed Dec. 19, 2005, entitled "Pushbuffer Launching of Processor Threads"; and application Ser. No. 11/535,871, filed Sep. 27, 2006, entitled "Compute Thread Array Synchronization." The respective disclosures of these applications are incorporated herein by reference for all purposes.

BACKGROUND OF THE INVENTION

The present invention relates in general to parallel processing and in particular to methods for scalably exploiting parallelism in a parallel processing system.

"Parallel processing" refers to the ability of computer systems to execute two or more operations at the same time. Numerous systems possessing varying kinds and degrees of parallel processing capability (or parallelism) have been developed over the years. These include MIMD systems that are capable of executing multiple different instructions in parallel on multiple input data values, as well as SIMD systems that execute the same instruction on multiple input data values in parallel.

Conventionally, exploiting parallelism in a computing system requires that the programmer or compiler be aware of the available parallelism. In one programming model, the programmer (or compiler) knows what parallel processing capability a particular system has and creates code that explicitly distributes the work across the parallel processing hardware. For instance, in a system with two processing cores, the program code would include explicit instructions to spawn new processes or threads and to assign processes or threads to specific processing cores (which may be in the same processor or different processors). Such instructions can be inserted by the programmer or by a compiler based on configuration information for a particular system.

Code generated in this manner is not scalable, meaning that it is not readily transportable to other systems with different degrees or kinds of parallelism. For instance, code specifically written (or compiled) for a single core processor can be executed on a dual-core processor, but the code will use only one of the cores, resulting in inefficiency to the extent that the code includes tasks that could be done in parallel. To exploit the parallelism provided by the second core, the code would have to be rewritten (or at least recompiled) for a dual-core system. Similarly, code specific to a two-core system would have to be rewritten and/or recompiled to exploit the higher degree of parallelism provided in a four-core system, and so on. Scaling in the other direction is also problematic, as code written and compiled for a system with a number C of cores will generally not be executable on a system with fewer than C cores; such code would need to be rewritten and/or recompiled in order to execute at all.

A more scalable model is sometimes used in server farms, where incoming processing tasks are distributed among multiple servers based on server availability. In some farms, there is a centralized work manager that automatically directs each incoming task to one or another of the servers, which executes the task. The work manager must be programmed with information about the number and capacity of the various servers, but this information does not need to be in the program code that defines the tasks to be performed. Further, the task request need not specify a particular server; thus, the programmer or process that is the source of processing tasks need not be aware of the number of servers in the farm.

Within each processing task, however, the scalability problem persists. Any parallelism that might be present in a particular server is exploited only to the extent that the code associated with the processing task explicitly distributes the work. Thus, the code must still be programmed and/or compiled for a specific parallel processing configuration and must be rewritten or recompiled to obtain maximum efficiency in a different configuration.

It would therefore be desirable to provide techniques for scalably exploiting parallelism in a parallel processing subsystem.

BRIEF SUMMARY OF THE INVENTION

Embodiments of the present invention provide methods for scalably exploiting parallelism in a parallel processing subsystem. A problem to be solved is hierarchically decomposed into at least two levels of sub-problems. Individual threads of program execution are defined to solve the lowest (level-0) sub-problems. The threads are grouped into one or more thread arrays, each of which solves a level-1 sub-problem. The thread arrays are executable by processing cores, each of which has sufficient resources to execute at least one thread array at a time. In some embodiments, the thread arrays are cooperative thread arrays within which threads may share input data, output data, and/or intermediate results with each other. In some embodiments, thread arrays can be further grouped into grids of independent thread arrays, which solve higher-level (level-2) sub-problems or an entire problem. Where multiple grids are used to solve a problem, dependencies may exist between grids; for instance a first grid might produce a result that is further processed by a second grid. To the extent that dependencies exist between grids, the grids are not executed in parallel; independent grids, however, can be executed in parallel to the extent that resources are available.

In some embodiments, thread arrays within a grid can be distributed across as many processing cores as happen to be available in a particular system implementation. Thus, to the extent that sufficient execution resources are available, the thread arrays of a grid are executed in parallel; to the extent that execution resources are insufficient for parallel execution of all thread arrays of the grid, the thread arrays can be executed sequentially; the grid will be processed eventually in any system capable of processing a single thread array, although the time needed to process the grid will be longer in systems where fewer thread arrays can be executed in parallel.

According to one aspect of the present invention, a method for exploiting available parallelism in a computer system to process a set of data elements includes defining program code for processing at least one of the plurality of data elements and defining a first number ($n_1$) of blocks, where each block includes a number ($n_e$) of the data elements. A thread array corresponding to each block is defined; each thread array includes a number ($n_0$) of threads of execution of the program code, with the number $n_0$ being sufficient to process each of the $n_e$ data elements in the corresponding block. For instance, each thread might process one element, two elements, or an arbitrary number of elements. In some embodiments, the thread arrays are cooperative thread arrays, in which data is sharable among the threads of the same cooperative thread array. The $n_1$ thread arrays are automatically distributed among one or more of a number $C_{tot}$ of processing cores of the computer system. Each of the processing cores is operated to execute each of the thread arrays distributed thereto. Executing a thread array advantageously includes executing the $n_0$ threads of the program code to process each of the $n_e$ data elements in the corresponding block and storing a result of processing each of the $n_e$ data elements in a memory.

To exploit the parallelism available in a given system to the greatest extent possible, the act of automatically distributing may be performed in a manner such that in the event that $n_1$ is at least equal to $C_{tot}$, every processing core of the computer system receives at least one thread array. Thus, all cores are given at least some work to do. In a given system, if a single processing core is available, automatically distributing the $n_1$ thread arrays includes delivering the $n_1$ thread arrays to the single processing core, which may execute the thread arrays sequentially. If multiple processing cores are available, then the $n_1$ thread arrays are advantageously distributed among all of the cores. If multiple parallel processing units are available, the $n_1$ thread arrays are advantageously distributed among all of the parallel processing units; if any of the parallel processing units has multiple cores, the thread arrays distributed to that parallel processing unit can be further distributed among the cores therein.

According to another aspect of the present invention, a method for exploiting available parallelism in a computer system to process a set of data elements includes defining program code for processing at least one of the data elements; defining a number ($n_2$) of grids, where each grid includes multiple data elements; and defining, within each grid, a number ($n_1$) of blocks, where each block includes a number ($n_e$) of the plurality of solution elements. A thread array corresponding to each block within each grid is defined; each thread array includes a number ($n_0$) of threads of execution of the program code, with the number $n_0$ being sufficient to process each of the $n_e$ data elements in the corresponding block. The $n_1$ thread arrays for each of the $n_2$ grids are automatically distributed across one or more processing cores of a computer system. Each of the processing cores is operated to execute each of the thread arrays distributed thereto. Executing a thread array advantageously includes executing the $n_0$ threads of the program code to process each of the $n_e$ data elements in the corresponding block and storing a result of processing each of the $n_e$ data elements in a memory.

In some embodiments, the computer system has multiple parallel processing units, and the $n_1$ thread arrays for a first one of the $n_2$ grids may be distributed to a first parallel processing unit while the $n_1$ thread arrays for a second one of the $n_2$ grids are distributed to a second parallel processing unit. If the first or the second parallel processing unit has multiple cores, that processing unit can further distribute the $n_1$ thread arrays among its cores.

In another embodiment, the $n_2$ grids may include at least a first grid and a second grid, with the second grid being dependent on a result of processing the first grid. Where this is the case, distributing the thread arrays may include distributing the $n_1$ thread arrays of the first grid among the one or more processing cores and distributing the $n_1$ thread arrays of the second grid among the one or more processing cores after the processing cores have completed execution of all of the $n_1$ thread arrays of the first grid.

The following detailed description together with the accompanying drawings will provide a better understanding of the nature and advantages of the present invention.

DETAILED DESCRIPTION OF THE INVENTION

Embodiments of the present invention provide methods for scalably exploiting parallelism in a parallel processing subsystem. A problem to be solved is hierarchically decomposed into at least two levels of sub-problems. Individual threads of program execution are defined to solve the lowest (level-0) sub-problems. The threads are grouped into one or more thread arrays, each of which solves a level-1 sub-problem. The thread arrays are executable by processing cores, each of which has sufficient resources to execute at least one thread array at a time. In some embodiments, the thread arrays are cooperative thread arrays within which threads may share input data, output data, and/or intermediate results with each other. In some embodiments, thread arrays can be further grouped into grids of independent thread arrays, which solve higher-level (level-2) sub-problems or an entire problem. Where multiple grids are used to solve a problem, dependencies may exist between grids; for instance a first grid might produce a result that is further processed by a second grid. To the extent that dependencies exist between grids, the grids are not executed in parallel; independent grids, however, can be executed in parallel to the extent that resources are available.

In some embodiments, thread arrays within a grid can be distributed across as many processing cores as happen to be available in a particular system implementation. Thus, to the extent that sufficient execution resources are available, the thread arrays of a grid are executed in parallel; to the extent that execution resources are insufficient for parallel execution of all thread arrays of the grid, the thread arrays can be executed sequentially; the grid will be processed eventually in any system capable of processing a single thread array, although the time needed to process the grid will be longer in systems where fewer thread arrays can be executed in parallel.

System Overview

Figure 1:
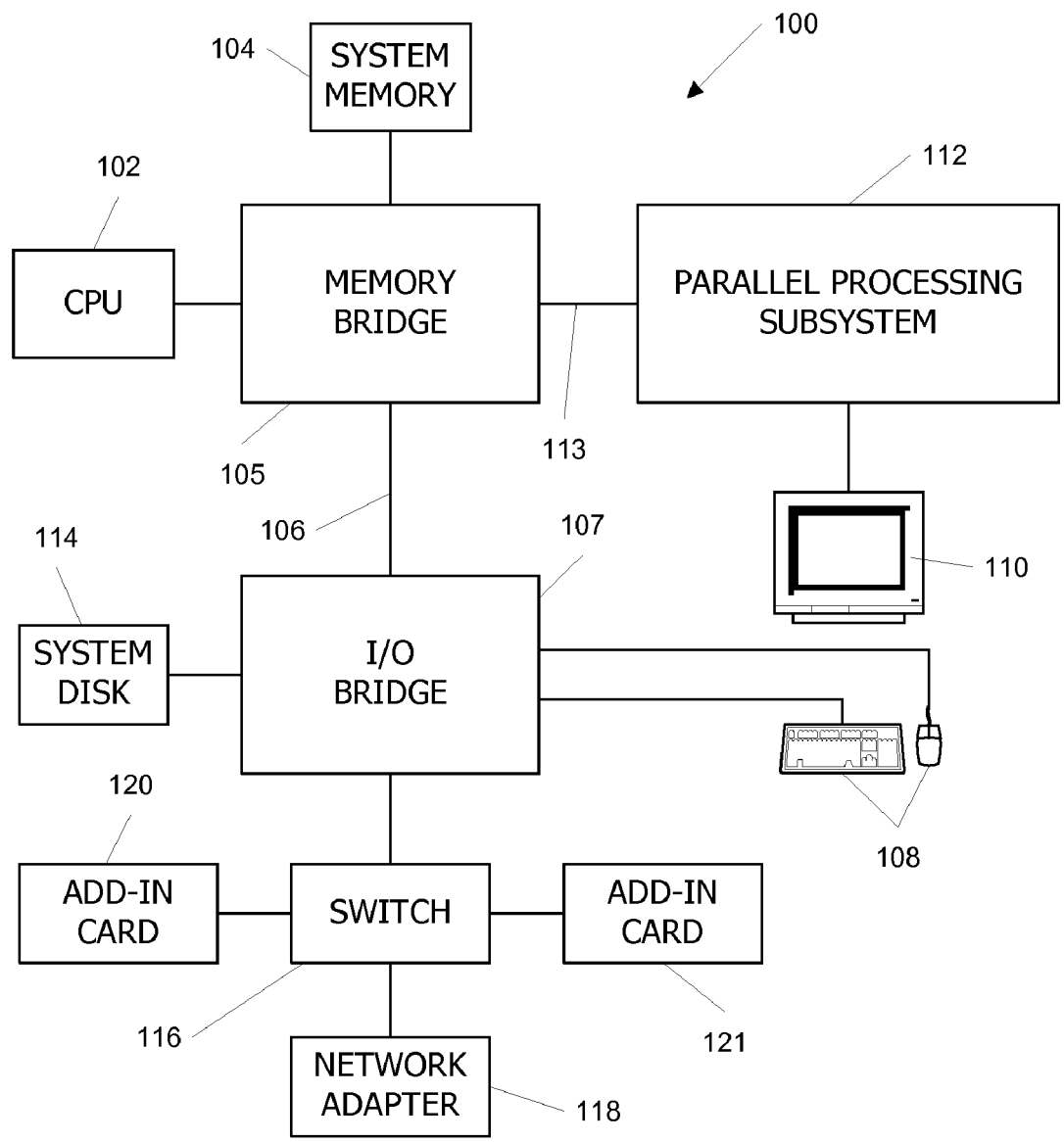
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
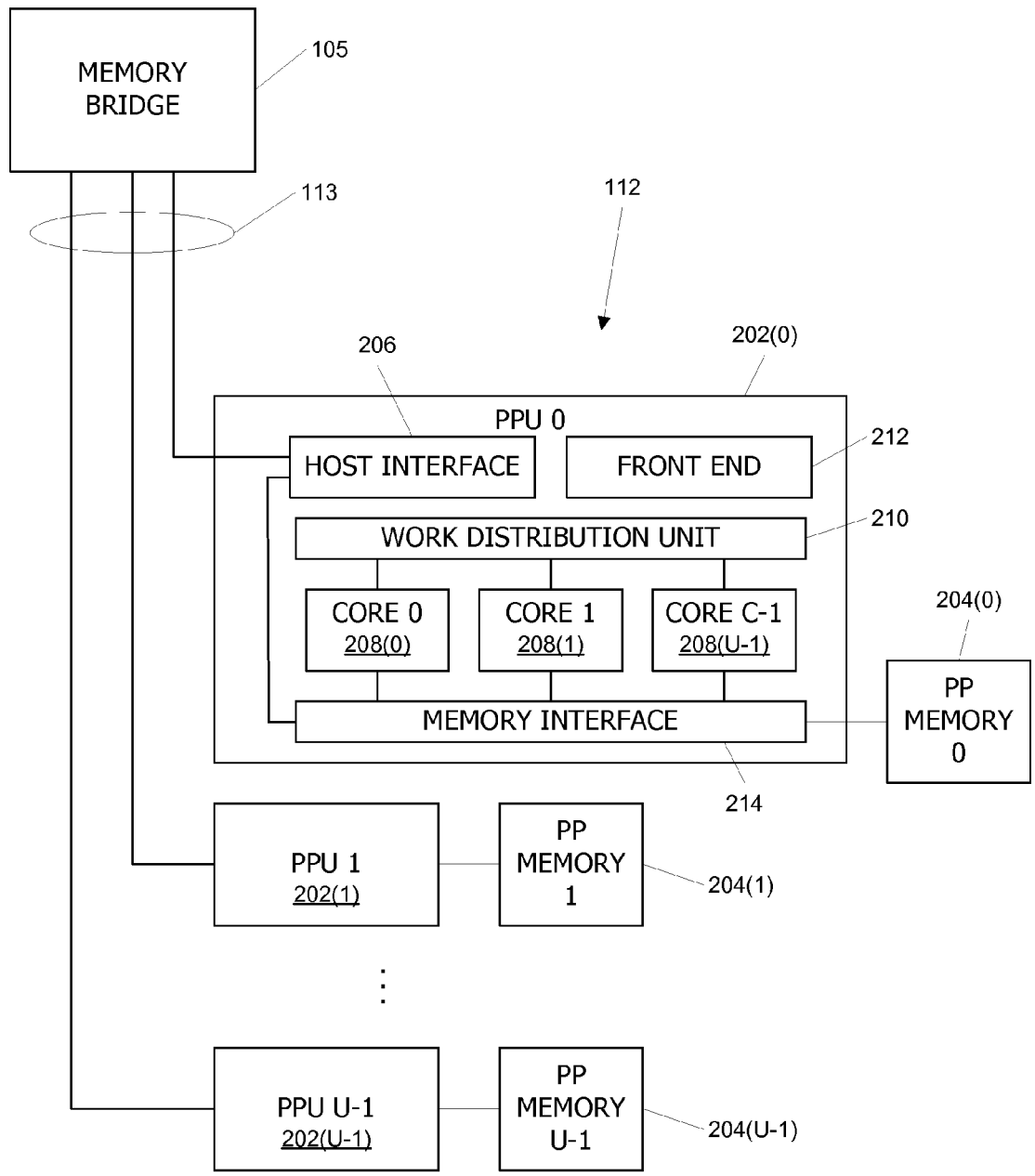
FIG. 2 is a block diagram of a parallel processing subsystem for the computer system of FIG. 1.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≧1. Each processing core 208 is capable of executing a large number (e.g., tens or hundreds) of threads concurrently; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, PP subsystem 112 may include one or more PPUs 202 that operate as graphics processors and one or more other PPUs 202 that are used for general-purpose computations. The PPUs may be identical or different, and each PPU may have its own dedicated PP memory device(s) or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU may be integrated into a bridge chip or processor chip or provided as a discrete chip with a high-speed link (e.g., PCI-E) connecting the PPU to system memory, e.g., via a bridge chip.

As noted above, any number of PPUs can be included in a parallel processing subsystem. For instance, multiple PPUs can be provided on a single add-in card, or multiple add-in cards can be connected to communication path 113, or one or more of the PPUs could be integrated into a bridge chip. The PPUs in a multi-PPU system may be identical to or different from each other; for instance, different PPUs might have different numbers of cores, different amounts of local PP memory, and so on. Where multiple PPUs are present, they may be operated in parallel to process data at higher throughput than is possible with a single PPU.

Systems incorporating one or more PPUs may be implemented in a variety of configurations and form factors, including desktop, laptop, or handheld personal computers, servers, workstations, game consoles, embedded systems, and so on.

Core Overview

Figure 3:
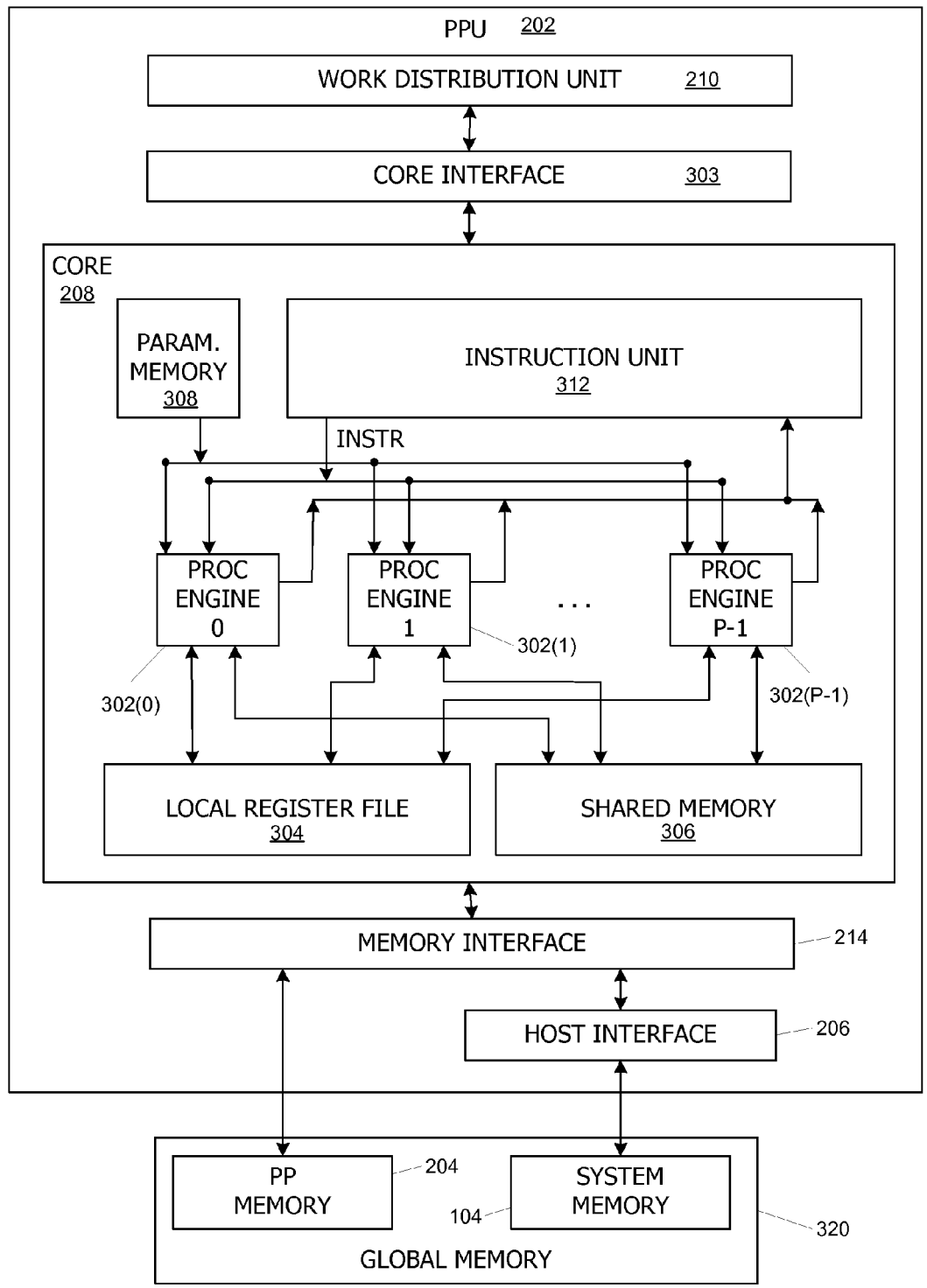
FIG. 3 is a block diagram showing further details of a parallel processing unit usable in an embodiment of the present invention.

FIG. 3 is a block diagram showing further details of a PPU 202 usable in an embodiment of the present invention. PPU 202 includes a core 208 (or multiple cores 208) configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory 320, which can include, e.g., PP memory 204 and/or system memory 104, with system memory 104 being accessible by memory interface 214 via host interface 206 as described above. It is to be understood that any memory external to PPU 202 may be used as global memory 320. Processing engines 302 can be coupled to memory interface 214 via an interconnect (not explicitly shown) that allows any processing engine 302 to access global memory 320.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency.

Instruction unit 312 is configured such that, for any given processing cycle, the same instruction (INSTR) is issued to all P processing engines 302. Thus, at the level of a single clock cycle, core 208 implements a P-way SIMD microarchitecture. Since each processing engine 302 is also multithreaded, supporting up to G threads, core 208 in this embodiment can have up to P*G threads executing concurrently. For instance, if P=16 and G=24, then core 208 supports up to 384 concurrent threads.

Because instruction unit 312 issues the same instruction to all P processing engines 302 in parallel, core 208 is advantageously used to process threads in "SIMD groups." As used herein, a "SIMD group" refers to a group of up to P threads of execution of the same program on different input data, with one thread of the group being assigned to each processing engine 302. (A SIMD group may include fewer than P threads, in which case some of processing engines 302 will be idle during cycles when that SIMD group is being processed.) Since each processing engine 302 can support up to G threads, it follows that up to G SIMD groups can be executing in core 208 at any given time.

On each clock cycle, one instruction is issued to all P threads making up a selected one of the G SIMD groups. To indicate which thread is currently active, a "group index" (GID) for the associated thread may be included with the instruction. Processing engine 302 uses group index GID as a context identifier, e.g., to determine which portion of its assigned lane in local register file 304 should be used when executing the instruction. Thus, in a given cycle, all processing engines 302 in core 208 are nominally executing the same instruction for different threads in the same group. (In some instances, some threads in a group may be temporarily idle, e.g., due to conditional or predicated instructions, divergence at branches in the program, or the like.)

Operation of core 208 is advantageously controlled via a core interface 303. In some embodiments, core interface 303 receives data to be processed (e.g., vertex data and/or pixel data) as well as state parameters and commands defining how the data is to be processed (e.g., what program is to be executed) from work distribution unit 210. Core interface 303 can load data to be processed into shared memory 306 and parameters into parameter memory 308. Core interface 303 also initializes each new thread or SIMD group in instruction unit 312, then signals instruction unit 312 to begin executing the threads. When execution of a thread or SIMD group is completed, core 208 advantageously notifies core interface 303. Core interface 303 can then initiate other processes, e.g., to retrieve output data from shared memory 306 and/or to prepare core 208 for execution of additional threads or SIMD groups.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Thread Arrays and Cooperative Thread Arrays

In some embodiments, multithreaded processing core 208 of FIG. 3 can execute general-purpose computations using thread arrays. As used herein, a "thread array" is a group consisting of a number ($n_0$) of threads that concurrently execute the same program on an input data set to produce an output data set. Each thread in the thread array is assigned a unique thread identifier ("thread ID") that is accessible to the thread during its execution. The thread ID controls various aspects of the thread's processing behavior. For instance, a thread ID may be used to determine which portion of the input data set a thread is to process and/or to determine which portion of an output data set a thread is to produce or write.

In some embodiments, the thread arrays are "cooperative" thread arrays, or CTAs. As with other types of thread arrays, a CTA is a group of multiple threads that concurrently execute the same program (referred to herein as a "CTA program") on an input data set to produce an output data set. In a CTA, the threads can cooperate by sharing data with each other in a manner that depends on thread ID. For instance, in a CTA, data can be produced by one thread and consumed by another.

In some embodiments, synchronization instructions can be inserted into the CTA program code at points where data is to be shared to ensure that the data has actually been produced by the producing thread before the consuming thread attempts to access it. The extent, if any, of data sharing among threads of a CTA is determined by the CTA program; thus, it is to be understood that in a particular application that uses CTAs, the threads of a CTA might or might not actually share data with each other, depending on the CTA program.

In some embodiments, threads in a CTA share input data and/or intermediate results with other threads in the same CTA using shared memory 306 of FIG. 3. For example, a CTA program might include an instruction to compute an address in shared memory 306 to which particular data is to be written, with the address being a function of thread ID. Each thread computes the function using its own thread ID and writes to the corresponding location. The address function is advantageously defined such that different threads write to different locations; as long as the function is deterministic, the location written to by any thread is predictable. The CTA program can also include an instruction to compute an address in shared memory 306 from which data is to be read, with the address being a function of thread ID. By defining suitable functions and providing synchronization techniques, data can be written to a given location in shared memory 306 by one thread of a CTA and read from that location by a different thread of the same CTA in a predictable manner. Consequently, any desired pattern of data sharing among threads can be supported, and any thread in a CTA can share data with any other thread in the same CTA.

CTAs (or other types of thread arrays) are advantageously employed to perform computations that lend themselves to a data-parallel decomposition. As used herein, a "data-parallel decomposition" includes any situation in which a computational problem is solved by executing the same algorithm multiple times in parallel on input data to generate output data; for instance, one common instance of data-parallel decomposition involves applying the same processing algorithm to different portions of an input data set in order to generate different portions an output data set. Examples of problems amenable to data-parallel decomposition include matrix algebra, linear and/or nonlinear transforms in any number of dimensions (e.g., Fast Fourier Transforms), and various filtering algorithms including convolution filters in any number of dimensions, separable filters in multiple dimensions, and so on. The processing algorithm to be applied to each portion of the input data set is specified in the CTA program, and each thread in a CTA executes the same CTA program on one portion of the input data set. A CTA program can implement algorithms using a wide range of mathematical and logical operations, and the program can include conditional or branching execution paths and direct and/or indirect memory access.

For example, as is known in the art, an array of data values (e.g., pixels) can be filtered using a 2-D kernel-based filter algorithm, in which the filtered value of each pixel is determined based on the pixel and its neighbors. In some instances the filter is separable and can be implemented by computing a first pass along the rows of the array to produce an intermediate array, then computing a second pass along the columns of the intermediate array. In one CTA implementation of a separable 2-D filter, the threads of the CTA load the input data set (or a portion thereof) into shared memory 306, then synchronize. Each thread performs the row-filter for one point of the data set and writes the intermediate result to shared memory 306. After all threads have written their row-filter results to shared memory 306 and have synchronized at that point, each thread performs the column filter for one point of the data set. In the course of performing the column filter, each thread reads the appropriate row-filter results from shared memory 306, and a thread may read row-filter results that were written by any thread of the CTA. The threads write their column-filter results to shared memory 306. The resulting data array can be stored to global memory or retained in shared memory 306 for further processing. Where shared memory 306 can be accessed with lower latency and/or greater bandwidth than global memory, storing intermediate results in shared memory 306 advantageously improves processor throughput.

In one embodiment, a driver program executing on CPU 102 of FIG. 1 writes commands defining the CTA to a pushbuffer (not explicitly shown) in memory (e.g., system memory 104), from which the commands are read by a PPU 202. The commands advantageously are associated with state parameters such as the number of threads in the CTA, the location in global memory 320 of an input data set to be processed using the CTA, the location in global memory 320 of the CTA program to be executed, and the location in global memory 320 where output data is to be written. The state parameters may be written to the pushbuffer together with the commands. In response to the commands, core interface 303 loads the state parameters into core 208 (e.g., into parameter memory 308), then begins launching threads until the number of threads specified in the CTA parameters have been launched. In one embodiment, core interface 303 assigns thread IDs sequentially to threads as they are launched, as described in above-referenced application Ser. No. 11/305,178. More generally, since all threads in a CTA execute the same program in the same core 208, any thread can be assigned any thread ID, as long as each valid thread ID is assigned to only one thread. It should be noted that as long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In one embodiment, if a CTA includes some number ($n_0$) of threads, thread IDs are simply sequential (one-dimensional) index values from 0 to $n_0-1$. In other embodiments, multidimensional indexing schemes can be used. CTAs and execution thereof are described in further detail in above-referenced application Ser. No. 11/305,178.

Grids of CTAs

In some embodiments, a "grid" of related CTAs (or more generally thread arrays) can be defined. As used herein, a "grid" of CTAs is a collection of a number ($n_1$) of CTAs in which all CTAs are the same size (i.e., number of threads) and execute the same CTA program. The $n_1$ CTAs within a grid are advantageously independent of each other, meaning that execution of any CTA in the grid is not affected by execution of any other CTA in the grid. As will become apparent, this feature provides significant flexibility in distributing CTAs among available processing cores.

To distinguish different CTAs within a grid, a "CTA identifier" (or CTA ID) is advantageously assigned to each CTA of the grid. As with thread IDs, any unique identifier (including but not limited to numeric identifiers) can be used as a CTA ID. In one embodiment, CTA IDs are simply sequential (one-dimensional) index values from 0 to $n_1-1$. In other embodiments, multidimensional indexing schemes can be used. The CTA ID is common to all threads of a CTA and so may be stored in a state register (e.g., in parameter memory 308) that is accessible to all threads of the CTA; alternatively, the CTA ID might be stored in local register file 304 or in other storage accessible to the threads of the CTA. A thread of a given CTA within the grid advantageously uses its CTA ID in conjunction with its thread ID to determine, e.g., a source location for reading input data and/or a destination location for writing output data.

Defining a grid of CTAs can be useful, e.g., where it is desired to use multiple CTAs to solve different portions of a single large problem. For instance, it might be desirable to perform a filtering algorithm to generate a high-definition television (HDTV) image. As is known in the art, an HDTV image might include over 2 million pixels. If each thread generates one pixel, the number of threads to be executed would exceed the number of threads that can be processed in a single CTA (assuming a core of reasonable size and cost constructed using conventional integrated-circuit techniques).

This large processing task can be managed by dividing the image among multiple CTAs, with each CTA generating a different portion (e.g., a 16×16 tile) of the output pixels. All CTAs execute the same program, and the threads use a combination of the CTA ID and the thread ID to determine locations for reading input data and writing output data, so that each CTA operates on the correct portion of the input data set and writes its portion of the output data set to the correct location.

It should be noted that, unlike threads within a CTA (which can share data), CTAs within a grid advantageously do not share data with or otherwise depend on each other. That is, two CTAs of the same grid can be executed sequentially (in either order) or concurrently and still produce identical results. Consequently, a PPU 202 of FIG. 2 can execute a grid of CTAs and obtain a result by first executing one CTA in a core 208, then the next CTA in the same core 208, and so on until all CTAs of the grid have been executed. Alternatively, a PPU 202 can execute the same grid and obtain the same result by executing multiple CTAs in parallel (e.g., by assigning different CTAs to different cores 208 within the PPU).

In some instances, it may be desirable to define multiple ($n_2$) grids of CTAs, where each grid executes a different portion of a data-processing program or task. For example, the data-processing task might be divided into a number of "solution steps," where each solution step is performed by executing a grid of CTAs. As another example, the data processing task might include performing the same or similar operations on a succession of input data sets (e.g., successive frames of video data); a grid of CTAs can be executed for each input data set. The programming model advantageously supports at least these three levels of work definition (i.e., threads, CTAs, and grids of CTAs); additional levels could also be supported if desired.

For each thread in each CTA of each grid 400, a unique identifier of the form $I=[i_g, i_c, i_t]$ can be defined, where a grid identifier $i_g$ uniquely identifies the grid, a CTA ID $i_c$ uniquely identifies the CTA within the grid, and a thread ID $i_t$ uniquely identifies the thread within the CTA. In one embodiment, the unique identifier I is a triplet of integers, with $0 \leq i_g < n_2$; $0 \leq i_c < n_1$; and $0 \leq i_t < n_0$. In another embodiment, one or more of the grid, CTA, and thread identifiers might be expressed as a 2D coordinate pair, 3D triplet, or the like. The unique thread identifier I can be used, e.g., to determine a source location for input data within an array encompassing an input data set for an entire grid or multiple grids and/or to determine a target location for storing output data within an array encompassing an output data set for an entire grid or multiple grids.

It will be appreciated that the size (number $n_0$ of threads) of a CTA, size (number $n_1$ of CTAs) of a grid, and number ($n_2$) of grids used to solve a particular problem will depend on parameters of the problem and preferences of the programmer or automated agent that defines the problem decomposition. Thus, in some embodiments, the size of a CTA, the size of a grid, and the number of grids are defined by a programmer or driver program and are provided to core 208 and core interface 203 as state parameters.

Problem Decomposition and Mapping to Programming Model

In accordance with an embodiment of the present invention, CTAs and grids of CTAs can be used for scalable exploitation of available hardware parallelism. That is, once a problem to be solved has been defined in terms of grids, CTAs and threads, that problem will be soluble in any of a variety of parallel processing systems that implement a particular core design.

Problems that benefit from this scalable approach are usually characterized by the presence of a large number of data elements that can be processed in parallel. In some instances the data elements are output elements, each of which is generated by performing the same algorithm on different (possibly overlapping) portions of an input data set. In other instances, the data elements can be input elements that are each to be processed using the same algorithm.

Figure 4A:
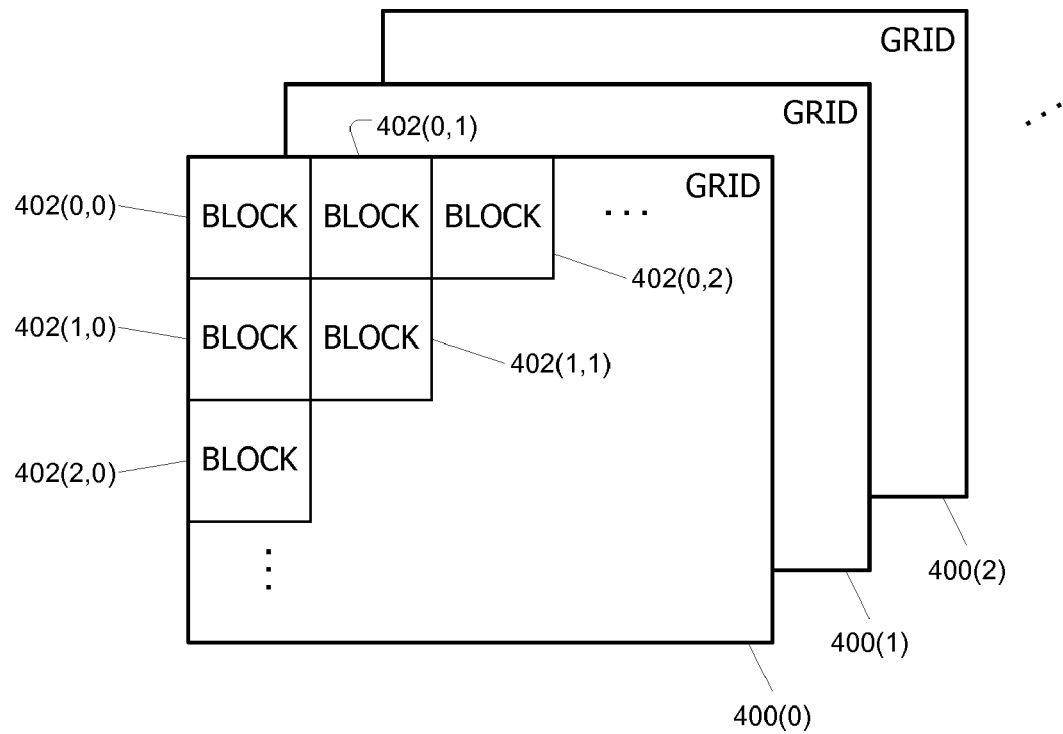
FIGS. 4A-4B illustrate decomposition of a problem in into grids, blocks and elements according to an embodiment of the present invention.
Figure 4B:
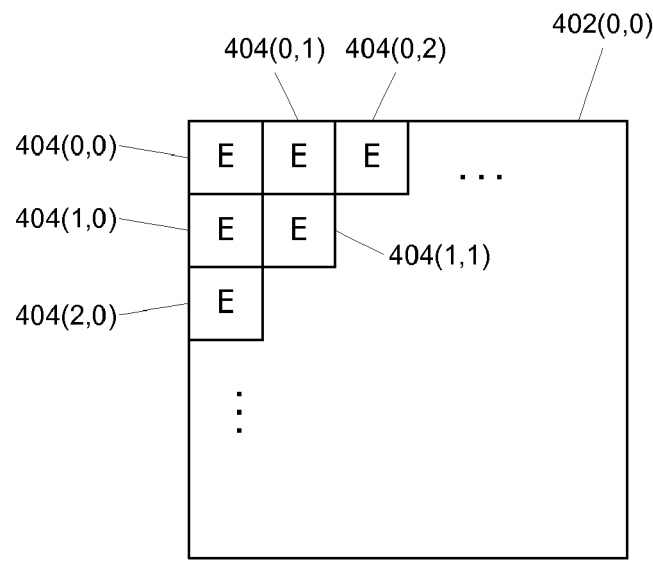

Such problems can always be decomposed into at least two levels and mapped onto the threads, CTAs, and grids described above. FIGS. 4A-4B illustrate decomposition of a problem in a manner amenable to processing using CTAs or grids of CTAs.

In FIG. 4A, a problem to be solved is represented as a number of grids 400. For instance, each grid might represent the result of one solution step in a complex data-processing task. As shown for grid 400(0), each grid 400 is divided into a number of blocks 402. Further, as shown in FIG. 4B for block 402(0,0), each block includes a number of elements 404. In the case of an HDTV image, each element 404 might be a pixel of the output image. The size (number of elements 404) of a block 402 is a matter of choice in the problem decomposition; however, since the programming model maps block 402 to CTAs (as described below), the block size is advantageously selected such that all elements in the block can be generated using a single CTA. In some embodiments, the decomposition is uniform, meaning that all grids 400 have the same number and arrangement of blocks 402, and all blocks 402 have the same number and arrangement of elements 404. In other embodiments, the decomposition can be non-uniform. For instance, different grids might include different numbers of blocks, and different blocks (in the same grid or different grids) might include different numbers of data elements.

Figure 5A:
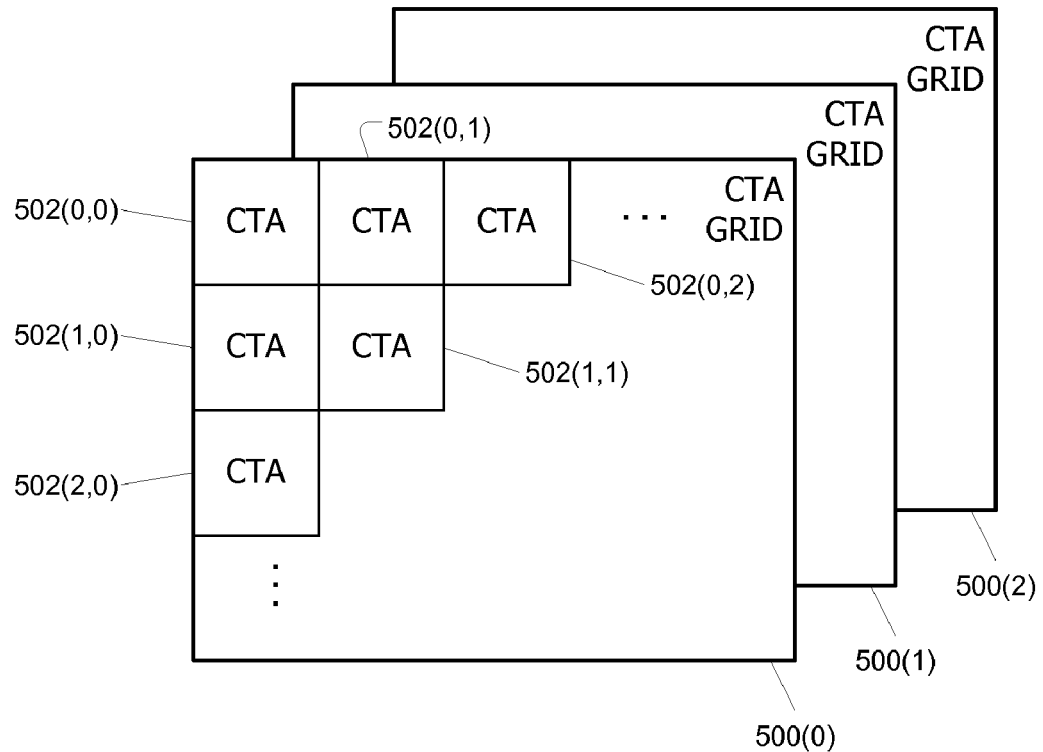
FIGS. 5A-5B illustrate the correspondence of grids, blocks and elements to grids, CTAs and threads in a programming model according to an embodiment of the present invention.
Figure 5B:
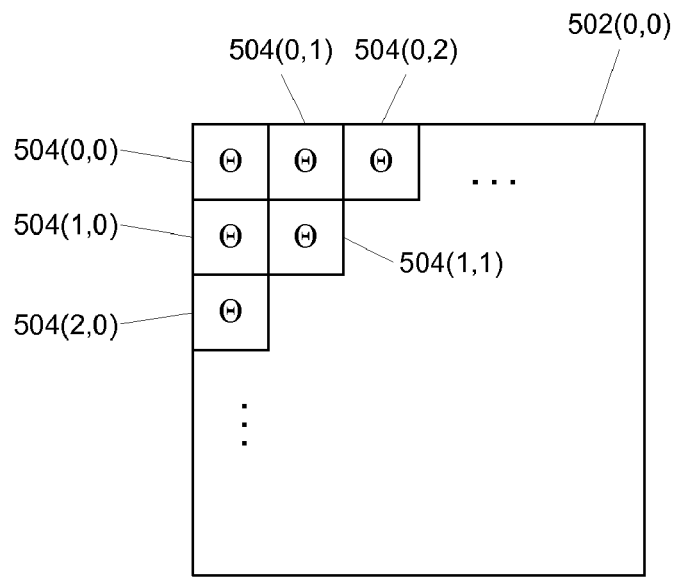

The grid/block/element problem decomposition depicted in FIGS. 4A-4B advantageously maps onto the grids, CTAs and threads of the programming model described above. FIGS. 5A-5B illustrate the correspondence. As shown in FIG. 5A, a number $n_2$ of CTA grids 500 can be defined. Each grid 500 includes a number $n_1$ of CTAs 502, and each CTA 502 includes a number $n_0$ of threads (Θ) 504. Comparing FIGS. 5A and 5B to FIGS. 4A and 4B, it can be seen that each thread 504 corresponds to an element 404 of the problem to be solved, each CTA 502 to a block 502, and each CTA grid 500 to a grid 400.

It should be noted that because each block 402 in the problem decomposition maps onto a CTA 502 in the programming model, the blocks for a particular problem should be defined such that a single CTA can process all of the elements 404 within that block. Thus, for instance, if the maximum size of a CTA is limited to G*P threads (as described above), then the maximum block size would be correspondingly limited.

In some embodiments, this constraint can be somewhat alleviated, as the mapping of elements 404 to threads 504 need not be 1:1. For instance, it may be desirable to define a CTA program that processes multiple elements 404. To the extent that instructions within a thread are executed sequentially in core 208, a thread that processes multiple elements 404 will typically take longer to execute than a thread that processes a single element 404; however, fewer CTAs would have to be executed to solve the problem. Such a tradeoff may be desirable and is a matter of design choice. Further, to the extent that the work per thread is increased, resources (e.g., shared memory space and/or LRF space) per thread might also need to increase, imposing an upper limit on the number of elements that can be handled in a single CTA. Thus, in some embodiments, the number of elements processed by a thread might be limited to an arbitrary positive integer k. For instance, if the CTA size is limited to $n_{0max}$=G*P threads, a block may include up to k*G*P elements. It is not required that all threads of a CTA process the same number of elements; for instance, some threads might process k elements while others process k−1 elements. If n threads each process k elements while $n_0$−n threads each process k−1 elements, the total number of elements in the block would be n*k+($n_0$−n)*(k−1).

To further clarify the decomposition and mapping process, specific examples will now be described; it is to be understood that these examples are illustrative and not limiting of the present invention.

In one example, the problem to be solved is the generation of an HDTV image using a video-filtering algorithm. The video-filtering algorithm, which may be conventional, operates on input video data in some input format (which might be HDTV or another known format) to generate HDTV images at a resolution of 1920×1080 pixels. Referring to FIG. 4A, the problem can be decomposed by identifying each image to be generated as a grid 400. The number $n_2$ of grids 400 will be equal to the number of frames to be generated, which might or might not be known at the outset.

Within each output image, each pixel corresponds to an element 404. Blocks 402 can be defined by forming groups of neighboring elements 404; each group might include, e.g., 16×16 or 16×32 pixels, depending on $n_{0max}$ and k, as well as the preferences of the programmer or automated agent that is performing the decomposition.

For a 1920×1080 HDTV image (grid 400) divided into blocks 404 of 16×16 pixels (elements 404) each, the corresponding grid 500 in the program model would include 8,100 CTAs. If each CTA thread produces one pixel, each CTA 502 would have 256 threads. Other decompositions are also possible; for instance, if 16×32 blocks are used, there would be 4,050 CTAs per grid; each CTA might have 512 threads that produce one pixel each or 256 threads that produce two pixels each.

In the HDTV example, each grid is a new image and is independent of any other grid. In other examples, a problem may be decomposed into "dependent" grids, meaning that execution of one grid depends in some way on the result of processing another grid. For example, one grid might use as input data results obtained by processing another grid, e.g., where the grids correspond to successive solution steps in a data processing program.

One case in which a decomposition into dependent grids can be useful is in a Fast Fourier Transform (FFT). As is known in the art, the FFT is a recursive algorithm that transforms an N-point set of time-domain samples to an N-point set of frequency-domain samples. The points in the transformed data set can be identified as the elements 404. In one possible decomposition, all N of the elements 404 are grouped into a single block 402, which maps to a single CTA 402 with N/M threads, where M is the number of output elements each thread produces. (In one embodiment, M is the radix of the FFT algorithm being used; in one common case, M=2.) However, if the number N/M exceeds $n_{0max}$, grouping the elements 404 into a single block 402 is not possible since the block 402 cannot be executed as a single CTA 502. In that case, multiple CTAs would be needed.

Given the recursive nature of the FFT algorithm, it is not possible to divide the N-point data set into subsets that can be independently transformed. It is possible, however, to divide the data set into subsets that can be partially transformed independently of each other using a grid of CTAs, then use an additional grid of CTAs to perform an additional transform stage, and so on until the transform is complete. Thus, the FFT problem might be decomposed into multiple grids 400, each of which includes multiple blocks 402; the programming model defines multiple grids 500, each of which includes multiple CTAs 502. In this case, the later grids are dependent on earlier grids.

Those of ordinary skill in the art with access to the present teachings will recognize that many other problems amenable to parallel processing can be decomposed according to the grid/block/element model and mapped onto the CTA-based programming model as described herein. For purposes of the present description, a few features of the model should be noted.

First, the elements within a block (or threads within a CTA) are not required to form a two-dimensional (2-D) array. In some instances, such as video data, a 2-D array may be a useful way to arrange the elements or index the threads. In other instances, however, such as in a 1-D FFT, a one-dimensional arrangement might be more useful. In still other instances, 3-D arrangements or arrangements of still higher dimensionality might be used. Similarly, the blocks (or CTAs) within a grid are not required to form a 2-D array; any number of dimensions that is convenient for a particular problem might be used. In the examples described above, grids are arranged along a single axis, such as a sequence of video frames or a sequence of transform stages in an FFT. However, for some applications, it may be useful to define a 2-D (or 3-D) array of grids or the like.

The problem should be decomposed such that blocks within a grid should be independent of each other, as are CTAs within a grid. For present purposes, two CTAs are independent if neither of the CTAs relies on results generated by the other. Thus, CTAs that process overlapping portions of the same input data set but do not otherwise share data can be considered independent. Because CTAs within a grid are independent of each other, the CTAs of a grid can be executed sequentially or in parallel depending on available resources. This property allows the scalable exploitation of system parallelism, as described below.

At the grid level, grids can be independent of each other (as in the image filtering example) or dependent (as in the FFT example). In cases where a subsequent grid is dependent on a prior grid, the CTAs of the subsequent grid are advantageously not launched until execution of all CTAs of the prior grid is finished. In some embodiments, "wait-for-completion" pushbuffer commands or semaphores may be used to control launching of a dependent grid, e.g., as described in above-referenced application Ser. No. 11/321,002 and application Ser. No. 11/535,871.

Scalability

As described above, in accordance with an embodiment of the present invention, any problem that is amenable to a data-parallel decomposition can be solved by defining and executing one or more grids of CTAs. Problems decomposed in this manner can be solved by executing the same grid(s) of CTAs on different systems with different degrees of parallelism. As long as each system has sufficient parallelism to execute one CTA of up to $n_{0max}$ threads (e.g., as long as the system has at least one multithreaded processing core 208), all systems will be able to execute the grid, although the amount of time required to obtain the result will depend on the degree of parallelism. Where the cores in different systems are identical, the output data will be the same across all systems.

Figure 6A:
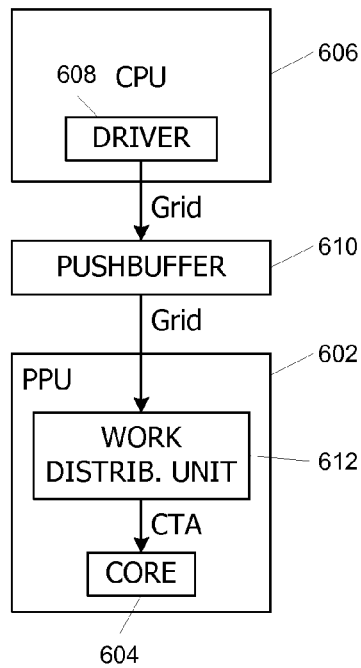
FIGS. 6A-6C are simplified block diagrams illustrating execution of CTA grids in computer systems with different degrees of parallelism according to embodiments of the present invention.
Figure 6B:
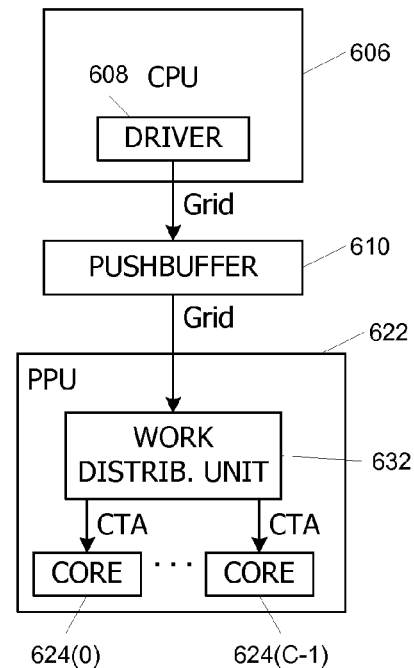
Figure 6C:
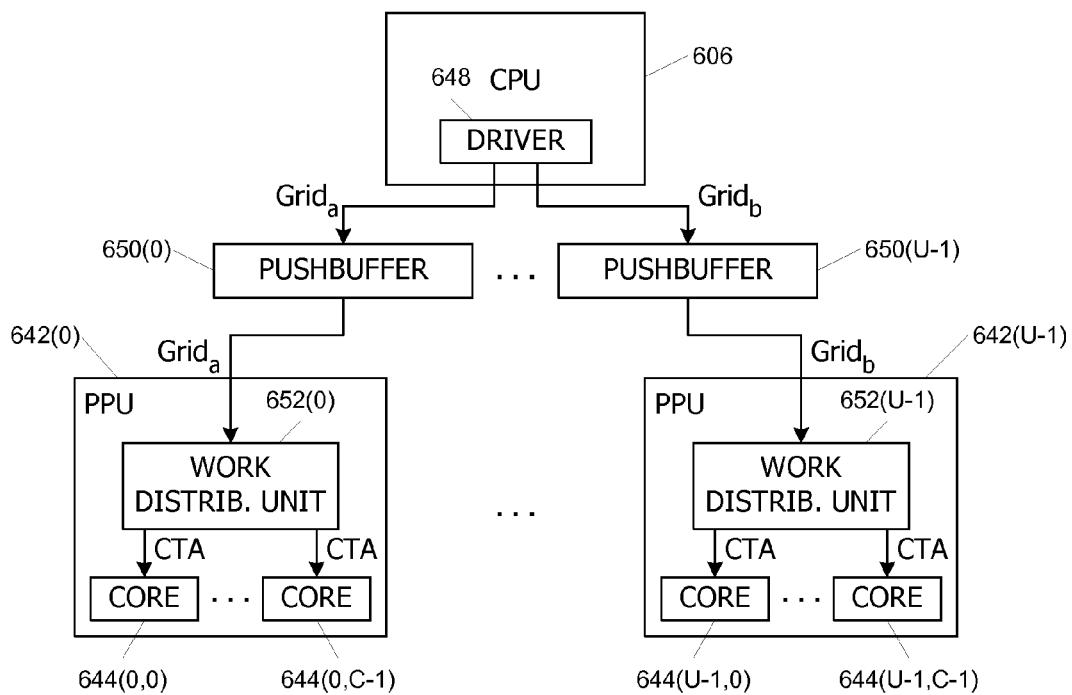

FIGS. 6A-6C are simplified block diagrams illustrating execution of CTA grids in systems with different degrees of parallelism. In FIG. 6A, a "minimal" system 600 has one PPU 602 with one core 604. PPU 602 may be an instance of PPU 202 of FIGS. 2 and 3 described above, and core 604 may be an instance of core 208. PPU 602 receives commands from a CPU 606 via a pushbuffer 610 and executes the commands.

In operation, CPU 606 executes a driver program 608 that generates commands, including "grid launch" commands, for PPU 202(0). The grid launch command has associated state parameters that define a grid of CTAs to be executed. In one embodiment, the state parameters include size parameters that specify the number of threads in each CTA and the number of CTAs in the grid. If the thread identifiers are multidimensional (e.g., 2-D, or 3-D), the size of the CTA in each dimension is advantageously specified; thus, the size might be specified as $n_0$ for a CTA with 1-D thread IDs or as $n_0 = d_0 * d_1 * d_2$ for a CTA with 3-D thread IDs. Similarly, if the CTA identifiers are multidimensional, the size of the grid in each dimension is advantageously specified. The state parameters also identify the CTA program to be executed by each thread, a source location (e.g., an array) in global memory 320 (see FIG. 3) for input data for the grid and a destination location (e.g., an array) in global memory 320 for output data produced by the grid.

A grid launch command and its associated state parameters are written to a pushbuffer 610. A work distribution unit 612 in PPU 602 receives the commands and parameters from pushbuffer 610 and begins generating a series of CTA launch instructions to core 604. The first CTA launch instruction directs core 604 to execute the first CTA in the grid. Once core 604 finishes execution of the first CTA, work distribution unit 612 can generate a second CTA launch instruction directing core 604 to execute the second CTA in the grid. Work distribution unit 612 continues to generate a new CTA launch command each time core 604 finishes a CTA until such time as all CTAs in the grid have been executed. At that point PPU 602 may return a signal to CPU 606 indicating that execution of the CTA grid is complete.

In some instances, depending on the size of the CTAs, core 604 might be able to process two or more CTAs concurrently, and work distribution unit 612 may generate CTA launch commands as fast as core 604 can process them. However, even if core 604 can execute only one CTA at a time, system 600 will eventually execute the entire grid. In system 600, the degree of parallelism (Π) is q, where q is the number of threads that core 604 can execute in parallel. (In core 208 of FIG. 3, q=P.)

In FIG. 6B, a "medium" system 620 is generally similar to minimal system 600 except that system 620 includes a PPU 622 that has multiple (C) cores 624. PPU 622 may be an instance of PPU 202 of FIGS. 2 and 3 described above, and each core 624 may be an instance of core 208. As in system 600, a CPU 606 executes a driver program 608 that generates commands, including grid launch commands, for PPU 622. A grid launch command and its associated state parameters are written to a pushbuffer 610. (It should be noted that CPU 602, driver 604, and pushbuffer 606 may be identical to the corresponding components of system 600 of FIG. 6A.)

Similarly to system 600, a work distribution unit 632 in PPU 622 receives the commands and state parameters from pushbuffer 610 and begins generating a series of CTA launch instructions. Because PPU 622 has multiple cores 624, however, work distribution unit 632 can distribute the CTA launch instructions among the C cores 624. For example, work distribution unit 632 can generate an initial set of C CTA launch instructions and deliver one CTA launch instruction to each core 624. When any one of cores 624 finishes a CTA, work distribution unit 632 delivers another CTA launch instruction to that core 624. Work distribution unit 632 continues to generate new CTA launch instructions until such time as all CTAs in the grid have been executed. At that point PPU 622 may return a signal to CPU 606 indicating that execution of the CTA grid is complete.

As noted with regard to system 600, in some instances, depending on the size of the CTAs, one core 624 might be able to process two or more CTAs concurrently, and work distribution unit 632 may generate CTA launch commands as fast as cores 624 can process them. However, even if each core 624 can execute only one CTA at a time, system 620 will eventually execute the entire grid. In system 620, the degree of parallelism is Π=C*q. It should be noted that any CTA grid that can be executed in system 620 can also be executed in system 600; however, system 620 will complete the grid approximately C times faster than system 600.

In FIG. 6C, a "large" system 640 is generally similar to systems 600 and 620, except that system 640 includes multiple (U) PPUs 642. Each PPU 642 includes a number (C) of cores 644. Although FIG. 6C suggests that each PPU 642 has the same number of cores 644, it is to be understood that different PPUs 642 might have different numbers of cores 644. PPU 642 may be an instance of PPU 202 of FIGS. 2 and 3 described above, and core 644 may be an instance of core 208. As in systems 600 and 620, a CPU 606 executes a driver program 608 that generates commands, including grid launch commands, for PPUs 642. In this case, driver 608 is provided with system configuration information indicating the presence of multiple PPUs 642, each of which has an associated pushbuffer 650. The pushbuffers 650 may be physically distinct buffers, logically distinct subdivisions within a single buffer, or the like.

To execute CTA grids, driver 608 generates one or more grid launch commands and associated state parameters and writes each command to one of the pushbuffers 650. For instance, if multiple independent CTA grids can be executed in parallel, driver 608 might write a grid launch command (Grid$_a$) for the first grid to pushbuffer 650(0) and a grid launch command (Grid$_b$) for the second grid to pushbuffer 650(U−1). In this case, PPU 642(0) would execute the first grid while PPU 642(U−1) executes the second grid. Alternatively, if there are fewer than U CTA grids to be executed in parallel, driver 608 can exploit the fact that CTAs within a grid are independent of each other by dividing the grid into U (or more) sub-grids so that the work can be distributed across all PPUs 642. Thus the Grid$_a$ and Grid$_b$ commands might actually be sub-grid launch commands. PPUs 642 can handle sub-grid launch commands in the same way as grid launch commands, except that instead of assigning CTA IDs starting at zero, each sub-grid should cover a different range within the defined CTA ID space. In one embodiment, state parameters of the sub-grid launch command can be used to specify the range of CTA IDs for a particular sub-grid.

As in system 620, a work distribution unit 652 in each PPU 642 receives the commands and state parameters from its respective pushbuffer 650 and begins generating a series of CTA launch instructions. Because each PPU 642 has multiple cores 644, work distribution unit 652 can distribute the CTA launch instructions among the C cores 644. For example, each work distribution unit 652(j) (where 0≦j≦U−1) can generate an initial set of C CTA launch instructions and deliver one CTA launch instruction to each core 644(j,0) to 644(j,C−1).

When any one of cores 644 finishes a CTA, the appropriate work distribution unit 652(j) delivers another CTA launch instruction to that core 644. Each work distribution unit 652(j) continues to generate new CTA launch instructions until such time as all CTAs in the grid (or portion of the grid) assigned to PPU 642(j) have been executed. At that point PPU 642 may return a signal to CPU 606 indicating that execution of the CTA grid (or its portion of the grid in the case of sub-grid processing) is complete.

As noted with regard to systems 600 and 620, in some instances, depending on the size of the CTAs, one core 644 might be able to process two or more CTAs concurrently, and a work distribution unit 652 may generate CTA launch commands as fast as its cores 644 can process them. However, even if each core 644 can execute only one CTA at a time, system 640 will eventually execute the entire grid. In system 640, the degree of parallelism is Π=U*C*q. It should be noted that any CTA grid that can be executed in system 640 can also be executed in either system 620 or system 600 as well; however, system 640 will complete the grid approximately U times faster than system 620 and approximately U*C times faster than system 600.

More generally, a CTA grid can be executed on any system with U processors, each of which has a number $C_j$ of identical cores (where 0≦j≦U−1), provided that the core is capable of executing at least one CTA at a time. If each core executes q threads in parallel, the degree of parallelism of the system is:

$$\Pi = q * \sum_{j=0}^{U-1} C_j.$$

Thus, systems with more processors and/or more cores per processor will have a higher degree of parallelism Π and will complete a given CTA grid faster, but all systems that meet the minimum qualification (i.e., at least one core with sufficient capacity to execute at least one CTA) will eventually complete the grid.

It should be noted that the problem decomposition does not have to be modified in any way to be executable on different systems because the programming model is scalable to any system with any degree of parallelism. For instance, in the systems of FIGS. 6A and 6B, operation of the driver is independent of the number of cores in a PPU. Multi-core parallelism, to whatever extent it is available in a particular PPU, is leveraged by the work distribution unit transparently to the driver.

As noted with reference to FIG. 6C, operation of the driver may depend on the number of PPUs, but not on the number of cores in each. However, internal driver behavior does not affect an application program that invokes a driver function to perform computations. The application program simply defines the problem to be solved as one or more grids of CTAs and delivers this problem definition to the driver through an appropriate application program interface (API). The driver determines whether and how to distribute the problem across multiple PPUs, transparently to the application.

The result is that an application can be written and compiled that will run, without modification, on any of systems 600, 620, 640 or any other parallel processing system capable of executing CTAs. This situation is unlike conventional systems in which application code written and compiled for one configuration of cores must be rewritten (or at least recompiled) to exploit a different degree of parallelism available in a system with a different configuration of cores.

It should also be noted that a problem decomposition can be optimized to take advantage of systems with a high degree of parallelism without hurting performance on systems with a lower degree of parallelism. For example, to make use of all cores in a system, it is desirable to partition the problem into at least $$C_{tot} = \sum_{j=0}^{U-1} C_j$$

CTAs that can be executed in parallel. By way of illustration, a large-scale system might include, e.g., 8 PPUs (U=8) with 16 cores each ($C_j$=16), which corresponds to $C_{tot}$=128. The HDTV filter example given above involves thousands of CTAs per grid, which easily satisfies the requirement. It should be noted that this requirement can be satisfied by defining a single grid of $n_1$ CTAs with $n_1 \geq C_{tot}$, or by defining $n_2$ independent grids with each grid having $n_1$ CTAs such that $n_2 * n_1 \geq C_{tot}$.

Increasing the number of CTAs so as to keep all cores occupied does not adversely affect performance on any system (large or small), as long as each CTA is large enough that the processing capacity of a single core is fully exploited. For example, in core 208 of FIG. 3, to leverage all of the P processing engines 302, each CTA advantageously has at least P threads. In addition, in some embodiments, processing engines 302 are pipelined, and to keep the pipelines fully busy, it may be desirable to have multiple SIMD groups to choose from when selecting a next instruction to issue. In such embodiments, there is a minimum number ($G_{min}$) of SIMD groups needed to keep processing engines 302 fully occupied. Thus, a minimum CTA size for efficient operation might be, e.g., $P*G_{min}$. In one embodiment, P=16 and $G_{min}$=4, so each CTA advantageously includes at least 64 threads for maximum efficiency.

Problem-Solving Processes and Automation

Figure 7:
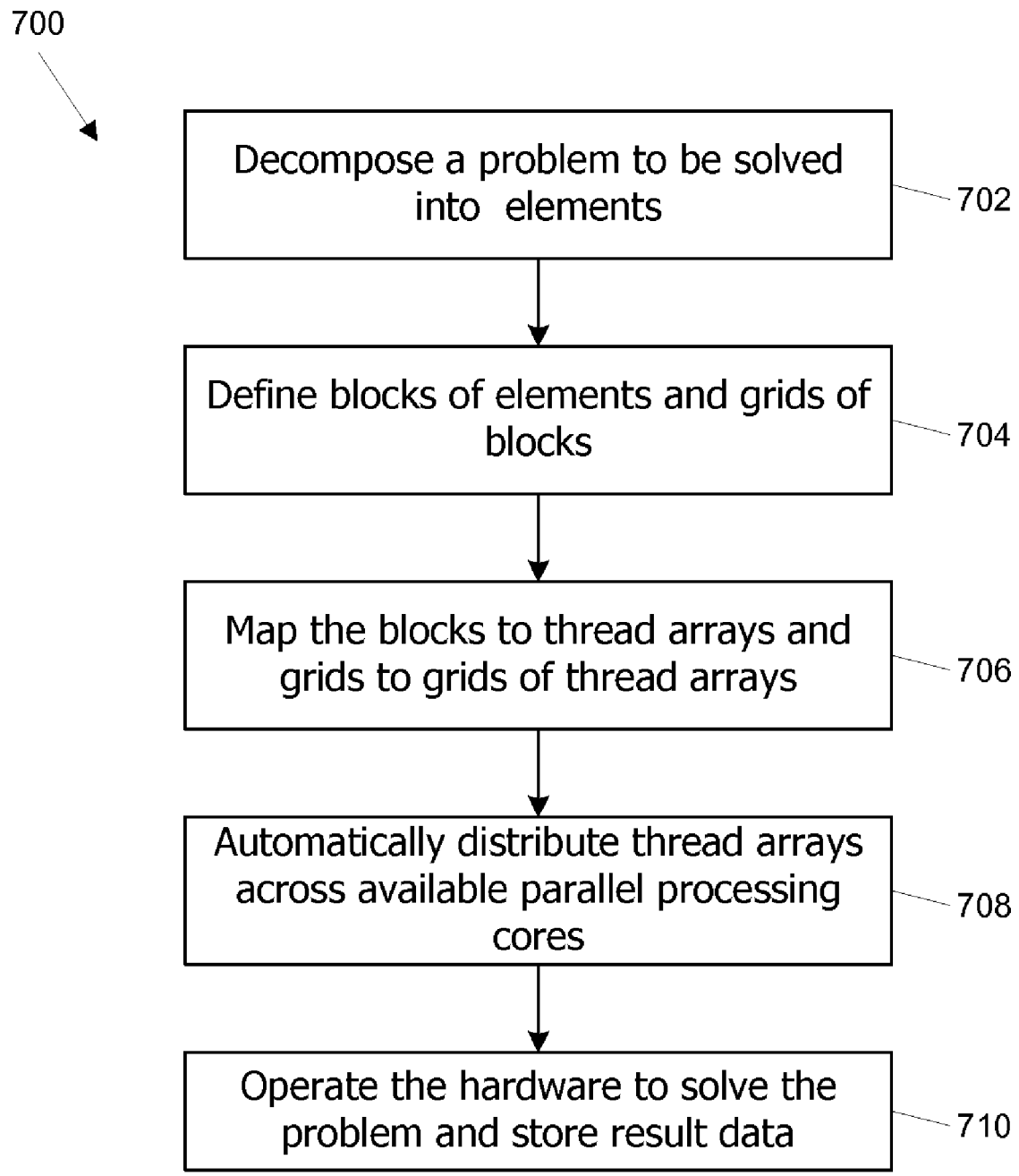
FIG. 7 is a flow diagram of a process for solving a computational problem using one or more grids of CTAs according to an embodiment of the present invention.

FIG. 7 is a flow diagram of a process 700 for solving a computational problem using one or more grids of thread arrays (e.g., CTAs) according to an embodiment of the present invention.

At step 702, a problem to be solved is decomposed into data elements, such as output elements to be generated by applying the same algorithm to generate each element. This algorithm can be defined as a per-element program. This program will be the basis of the CTA program.

At step 704, blocks of $n_e$ elements each are defined, and one or more ($n_1$) grids of blocks are also defined. Defining a block of elements may include specifying the size (number of elements) of the block in one or more dimensions, and defining a grid of blocks may include specifying the size (number of blocks) of the grid in one or more dimensions. As previously noted, the blocks should be defined such that data processing for each block is independent of all others, while grids may be independent of each other or dependent as desired. In addition, the blocks should be defined such that each block can be executed in a CTA of no more than $n_{0max}$ threads.

At step 706, the elements, blocks, and grids are mapped onto a programming model that provides scalable parallelism. Elements are mapped to threads of execution of a CTA program that is common to all threads. As noted above, the mapping may be one element per thread or multiple (up to k) elements per thread. The CTA program may be the per-element program, or a variation thereof (e.g., processing multiple elements in a single thread). Each block is mapped to a CTA of $n_0$ elements (where $n_0$ might or might not be equal to $n_e$), and grids of blocks are mapped to CTA grids, which may be independent or dependent in accordance with the problem definition at step 704.

At step 708, portions of the problem (e.g., CTAs and/or grids) are distributed across the available processing cores, and at step 710, the processing hardware is operated to solve the problem and store the result data for subsequent retrieval and use. As illustrated in FIGS. 6A-6C and described above, the distribution of CTAs across cores is advantageously transparent to the application, which allows the same application to execute on any system that meets or exceeds the minimum requirements. It is not necessary to modify the application (e.g., revise or recompile the code) or the problem decomposition and mapping of steps 702-706. Thus, the problem can be defined once and solved on a variety of systems that meet the minimum requirement (sufficient capacity to execute at least one CTA of size $n_{0max}$).

It will be appreciated that the process of FIG. 7 is illustrative and that variations and modifications are possible. Steps described as sequential may be executed in parallel, order of steps may be varied, and steps may be modified or combined. The decomposition of a particular problem and definition of corresponding CTAs, CTA programs, and grids may be carried out manually, or it may be automated. For example, an embodiment might leverage the Array Programming Language (APL), a well-known language for programming various operations to be performed on arrays of input data to generate arrays of output data. A compiler could be designed to decompose an array into grids, blocks and elements. This compiler would generate the CTA program that defines the processing work to be done by each thread based on the operation(s) specified in the source code and would also generate the dimensions of each CTA, number of CTAs, and number of grids based on the dimensions of the input array. Other techniques for automating the decomposition of a problem into $n_2$ grids of $n_1$ CTAs (blocks) of $n_0$ threads could also be used.

Further Embodiments

While the invention has been described with respect to specific embodiments, one skilled in the art will recognize that numerous modifications are possible. For instance, the embodiments described above may make reference to cases where all blocks have the same number of elements, all CTAs have the same number of threads and execute the same CTA program, and so on. In some applications, e.g., where multiple dependent grids are used, it may be desirable to have CTAs in different grids execute different CTA programs or to have different numbers and/or sizes of grids.

Although reference is made herein to "cooperative thread arrays," it is to be understood that some embodiments may use thread arrays in which data sharing between concurrent threads is not supported; in other embodiments in which such data sharing is supported, the threads defined for a given application might or might not actually share data.

In addition, while embodiments described above may make reference to thread arrays as having multiple threads, it is to be understood that in a "degenerate" case, a thread array might have only one thread. Thus, the present invention could be applied to providing scalability in programs to be executed on a CPU with one or more single-threaded cores. Using techniques described herein, a program could be written in such a manner that the threads could be distributed across any number of available CPU cores (e.g., using operating-system functionality) without requiring modification or recompilation of the code.

Although embodiments described herein may make reference to a CPU and a PPU as discrete components of a computer system, those skilled in the art will recognize that a CPU and a PPU can be integrated into a single device, and the CPU and PPU may share various resources such as instruction logic, buffers, processing engines and so on; or separate resources may be provided for parallel processing and other operations. Accordingly, any or all of the circuits and/or functionality described herein as being associated with the PPU could also be implemented in and performed by a suitably equipped CPU.

Further, while embodiments described herein may make reference to a PPU, it is to be understood that the circuits and/or functionality described herein could also be implemented in other types of processors, such as general-purpose or other special-purpose co-processors, or within a CPU.

Thus, although the invention has been described with respect to specific embodiments, it will be appreciated that the invention is intended to cover all modifications and equivalents within the scope of the following claims.

What is claimed is:

1. A method for exploiting available parallelism in a computer system to process a plurality of data elements, the method comprising:
    defining program code for processing at least one of the plurality of data elements;
    defining a first number ($n_1$) of blocks, each block including a number ($n_e$) of the plurality of data elements;
    defining a thread array corresponding to each block, each thread array including a number ($n_0$) of threads of execution of the program code sufficient to process each of the $n_e$ data elements in the corresponding block;
    automatically distributing the $n_1$ thread arrays among one or more of a number $C_{tot}$ of processing cores of the computer system;
    operating each of the one or more processing cores to execute each of the thread arrays distributed thereto, wherein executing a thread array includes executing the $n_0$ threads of the program code to process each of the $n_e$ data elements in the corresponding block and storing a result of processing each of the $n_e$ data elements in a memory.

2. The method of claim 1 wherein the act of automatically distributing is performed such that in the event that $n_1$ is at least equal to $C_{tot}$, every processing core of the computer system receives at least one thread array.

3. The method of claim 1 wherein defining a thread array includes defining a cooperative thread array such that data is sharable among the threads of the cooperative thread array.

4. The method of claim 1 wherein automatically distributing the $n_1$ thread arrays includes:
    delivering the $n_1$ thread arrays to a single processing core.

5. The method of claim 4 wherein during the act of operating, the single processing core executes the thread arrays sequentially.

6. The method of claim 1 wherein automatically distributing the $n_1$ thread arrays includes:
    distributing the $n_1$ thread arrays among a number C of parallel cores within a parallel processing unit, wherein the number C is at least two.

7. The method of claim 1 wherein automatically distributing the $n_1$ thread arrays includes:
    distributing the $n_1$ thread arrays among a number U of parallel processing units in the computer system, wherein the number U is at least two; and
    within each of the U parallel processing units, further distributing the thread arrays distributed thereto among a number $C_j$ of cores within that parallel processing unit.

8. The method of claim 7 wherein the number $C_j$ of cores is different for different ones of the U parallel processing units.

9. The method of claim 7 wherein the number $C_j$ of cores is the same for each of the U parallel processing units.

10. The method of claim 1 wherein the number $n_e$ of data elements in each block and the number $n_0$ of threads in each thread array are equal.

11. The method of claim 1 wherein the number $n_e$ of data elements in each block is less than or equal to a product of k times the number $n_0$ of threads in each thread array, wherein k is an integer greater than 1.

12. The method of claim 1 wherein the act of defining the thread array is performed automatically by a computer.

13. A method for exploiting available parallelism in a computer system to process a plurality of data elements, the method comprising:
    defining program code for processing at least one of the plurality of data elements;
    defining a number ($n_2$) of grids, each grid including a number of the plurality of data elements;
    defining, within each grid, a number ($n_1$) of blocks, each block including a number ($n_e$) of the plurality of solution elements;
    defining a thread array corresponding to each block within each grid, each thread array including a number ($n_0$) of threads of execution of the program code sufficient to process each of the $n_e$ data elements in the corresponding block;
    automatically distributing the $n_1$ thread arrays for each of the $n_2$ grids across one or more processing cores of a computer system;
    operating each of the one or more processing cores to execute each of the thread arrays distributed thereto, wherein executing a thread array includes executing the $n_0$ threads of the program code to process each of the $n_e$ data elements in the corresponding block and storing a result of processing each of the $n_e$ data elements in a memory.

14. The method of claim 13 wherein the act of automatically distributing includes:
    distributing the $n_1$ thread arrays for a first one of the $n_2$ grids to a first one of a plurality of parallel processing units in the computer system, wherein the first parallel processing unit includes a first number C1 of cores; and
    distributing the $n_1$ thread arrays for a second one of the $n_2$ grids to a second one of a plurality of parallel processing units in the system, wherein the second parallel processing unit includes a second number C2 of cores.

15. The method of claim 14 wherein each of the numbers C1 and C2 is greater than 1 and wherein the act of automatically distributing further includes:
   within the first parallel processing unit, distributing the $n_1$ thread arrays for the first grid across the C1 cores; and
   within the second parallel processing unit, distributing the $n_1$ thread arrays for the second grid across the C2 cores.

16. The method of claim 14 wherein the number C1 and the number C2 are equal.

17. The method of claim 13 wherein the $n_2$ grids include at least a first grid and a second grid, the second grid being dependent on a result of processing the first grid.

18. The method of claim 17 wherein the act of distributing includes:
   distributing the $n_1$ thread arrays of the first grid among the one or more processing cores; and
   distributing the $n_1$ thread arrays of the second grid among the one or more processing cores after the processing cores have completed execution of all of the $n_1$ thread arrays of the first grid.

* * * * *